(12) United States Patent
Sainct

(10) Patent No.: US 7,313,362 B1
(45) Date of Patent: Dec. 25, 2007

(54) HIGH ALTITUDE AIRBORNE CRAFT USED AS RADIO RELAY AND METHOD FOR PLACING SAID AIRBORNE CRAFT ON STATION

(75) Inventor: Hervé Sainct, Le Cannet (FR)

(73) Assignee: Alcatel, Paris (FR)

( * ) Notice: Subject to any disclaimer, the term of this patent is extended or adjusted under 35 U.S.C. 154(b) by 360 days.

(21) Appl. No.: 10/009,573

(22) PCT Filed: Jun. 19, 2000

(86) PCT No.: PCT/FR00/01686

§ 371 (c)(1),
(2), (4) Date: Dec. 12, 2001

(87) PCT Pub. No.: WO00/78607

PCT Pub. Date: Dec. 28, 2000

(30) Foreign Application Priority Data

Jun. 21, 1999 (FR) .................................. 99 07812

(51) Int. Cl.
*H04B 7/15* (2006.01)
(52) U.S. Cl. .................. 455/11.1; 455/12.1; 455/13.1; 455/431; 455/427; 244/158.4; 244/158.5; 244/158.6; 244/159.3; 244/171.1; 244/62
(58) Field of Classification Search ................ 455/431, 455/427, 428, 429, 12.1, 11.1, 13.1, 24; 244/62, 244/13, 45, 53, 155.4–156.6, 459.3, 171.1, 244/172.7
See application file for complete search history.

(56) References Cited

U.S. PATENT DOCUMENTS

| 3,742,538 | A | * | 7/1973 | Smith ........................ 441/118 |
| 4,740,792 | A | * | 4/1988 | Sagey et al. ................. 342/457 |
| 4,995,572 | A | | 2/1991 | Piasecki |
| 5,559,865 | A | * | 9/1996 | Gilhousen .................... 455/431 |
| 6,061,562 | A | * | 5/2000 | Martin et al. ................ 455/431 |
| 6,167,263 | A | * | 12/2000 | Campbell .................... 455/431 |
| 6,324,398 | B1 | * | 11/2001 | Lanzerotti et al. ........... 455/431 |
| 6,345,186 | B1 | * | 2/2002 | Schultz et al. ............... 455/441 |
| 6,425,552 | B1 | * | 7/2002 | Lee et al. ...................... 244/97 |
| 6,427,944 | B1 | * | 8/2002 | Passman .................. 244/118.1 |
| 6,550,717 | B1 | * | 4/2003 | MacCready et al. .......... 244/13 |

FOREIGN PATENT DOCUMENTS

| GB | 2 082 995 A | | 3/1982 |
| GB | 2082995 A | * | 3/1982 |
| JP | 63240079 | * | 10/1998 |
| WO | WO 9504407 A | | 2/1995 |
| WO | WO 9715992 A | | 5/1997 |
| WO | WO 9733790 A | | 9/1997 |

\* cited by examiner

*Primary Examiner*—Lewis West
*Assistant Examiner*—Sujatha Sharma
(74) *Attorney, Agent, or Firm*—Sughrue Mion, Pllc.

(57) ABSTRACT

The present invention relates to an aircraft and to a method of getting the aircraft onto station. According to the invention, said aircraft (1) includes propulsion means (2) capable only of enabling said aircraft (1) to move and to orient itself at high altitude, and said aircraft (1) is taken to its station in the high atmosphere, in particular in the stratosphere, by means of an independent transporter (3).

7 Claims, 2 Drawing Sheets

HIGH ALTITUDE AIRBORNE CRAFT USED AS RADIO RELAY AND METHOD FOR PLACING SAID AIRBORNE CRAFT ON STATION

BACKGROUND OF THE INVENTION

The present invention relates to an aircraft flying at high altitude, and to a method of getting the aircraft onto station, and also to applications thereof.

In the context of the present invention, "high altitude" means an altitude which is higher both than the altitude of civilian air links and the altitude of earth's cloud ceiling. The atmosphere situated at such high altitude is referred to below as the "high" atmosphere.

Over the last few years numerous studies and proposals, usually of a theoretical nature, have been made concerning the design and use of an aircraft, e.g. an airplane, a balloon, or a motorized parachute, for the purpose of going from the ground into the high atmosphere, e.g. into the stratosphere, and remaining there permanently, in order to perform specific processing or operations. By way of illustration, mention can be made of the proposals described in documents WO 96/12643 and WO 95/32893.

Very numerous operations can be envisaged such as observing the earth, telecommunications, scientific research, i.e. operations which are usually performed by satellites. Unfortunately, satellites are extremely expensive and can be considered only for major users, generally States or collections of States.

In contrast, an aircraft flying at high altitude could be affordable for small territorial entities, such as local or regional government organizations or companies of smaller size. Such an aircraft flying at high altitude does not require a launch rocket and, furthermore, unlike a satellite, since it remains in the atmosphere it can make use of components that are not qualified for use in space. This explains why such an aircraft is economically of interest.

Nevertheless, in spite of that, the high altitude aircraft solutions that have been envisaged or proposed are unfeasible, both economically and even technically. In particular:

because of their high weight, and thus significant weight/power ratio, the aircraft that have been proposed are generally too heavy to remain at high altitude on a permanent basis, in particular, the energy supplied by batteries and possibly by solar cells often remains inadequate;

in addition, the energy storage capacities proposed are generally insufficient to provide power over night; and other energy sources, such as transmitting energy by microwaves from the ground, are too complex and expensive and they are also harmful for the environment.

SUMMARY OF THE INVENTION

An object of the present invention is to remedy those drawbacks. The invention provides a low cost aircraft suitable for being used on station in the high atmosphere.

To this end, according to the invention, said aircraft is remarkable in that it includes propulsion means enabling said aircraft to maintain itself, to move itself, and to orient itself solely at high altitude.

Thus, since by virtue of the invention said aircraft does not have any generally very heavy, bulky, and expensive propulsion means suitable for taking it up to its high altitude station in the high atmosphere, its weight is very low, as is its cost, thereby enabling the above-specified drawbacks to be remedied.

Furthermore, using its own propulsion means, said aircraft, e.g. an airplane or a glider, can perform the movements and steering necessary to enable it to operate and to keep on station. Since such movements are generally very small, said aircraft does not require a great deal of energy to implement them, thus also making it possible to reduce its cost and to relax energy constraints.

It should also be observed that by eliminating in this way the constraints of taking the aircraft to altitude through higher pressures and temperatures, it is possible to optimize its characteristics specifically for operating on station in the high atmosphere, and in particular it is possible to opt for technical solutions that would be unsuitable for performing the stage of getting up to station, e.g. in terms of aerodynamics, operating temperature, energy storage, structural strength, etc. . . . .

To this end, the present invention proposes various technical characteristics serving in particular to reduce energy constraints and to optimize the operation of the aircraft. It should be observed that all of these technical characteristics specified below are specifically intended for operation in the high atmosphere and are not usable in particular on the ground or while getting up to station.

In a first particularly advantageous embodiment, said aircraft has at least one plasma thruster which operates on the basis of a plasma created from the surrounding air of the high atmosphere. Because of the characteristics of the high atmosphere, the plasma can be generated without any feedstock such as xenon, and without any bulky and heavy supply unit comprising tanks, circuits, and valves. Thus, the propulsion means are very simple and can operate without limit on duration since there is no fear of running out of a feedstock.

Furthermore, and advantageously, said aircraft includes at least one solar generator which is cooled by convection by means of the surrounding air in said high atmosphere.

Thus, said solar generator or its solar cells can operate at a temperature which is much lower than ambient temperature on the ground or the operating temperatures that are generally encountered in space using artificial satellites, thereby obtaining much better efficiency.

In addition, in an advantageous embodiment, said aircraft includes at least one storage battery having superconducting components. Because of the convective environment, at a temperature close to $-100°$ C., much better yield is obtained than can be obtained with ordinary batteries.

The present invention also provides a method of putting the above-specified aircraft onto station. To this end, according to the invention, said method is remarkable in that:

on the ground, said aircraft is secured to an independent transporter;

said transporter takes said aircraft up to a high altitude at which it is to operate making use solely of propulsion means of said transporter;

said transporter releases said aircraft at the altitude and at least approximately at the intended location of its operating station; and if necessary, said aircraft uses its own propulsion means to put itself finally on station and take up its proper orientation.

Preferably, said transporter comprises at least one balloon capable of rising to high altitude. Such a balloon, of usual type, presents very high carrying capacity and can therefore take the aircraft to the desired location without difficulty, at low cost, and with sufficient accuracy. In addition, the launch nacelle of the balloon can be recovered and reused. Furthermore, the balloon rises sufficiently slowly to avoid imposing aerodynamic and/or mechanical stresses on the aircraft (unlike a booster rocket or an airplane, for example).

The aircraft of the invention can be used in a very large number of applications, such as terrestrial observation, telecommunications, scientific research, weather observation, etc. . . . . Nevertheless, the preferred applications of the invention relate to a telecommunications network comprising a plurality of radio relays situated on the ground and/or in space.

To this end, a first application concerns a method of replacing a relay in such a telecommunications network.

According to the invention, said method is remarkable in that said radio relay is replaced by an aircraft as specified above, and provided with transceiver means for radio waves, said aircraft being taken to an altitude and a position such that said transceiver means lies in the same direction relative to at least one user of said telecommunications network as said replaced relay, with operation between said transceiver means and said user being performed via an existing interface. The user then has no need to modify either the interface or even the pointing of the antenna.

This makes it possible to replace radio relay networks based on the ground or in space easily, and in addition to do so without modifying the interfaces of user terminals, which is particularly advantageous particularly in terms of cost.

A second application concerns a network including at least one radio relay disposed on an aircraft as specified above. This characteristic makes it possible to extend a preexisting network or to create a new network entirely or in part out of relays of this type.

BRIEF DESCRIPTION OF THE DRAWINGS

The figures of the accompanying drawing show clearly how the invention can be implemented. In these figures, identical references designate elements that are similar.

DETAILED DESCRIPTION OF THE INVENTION

Figure 1:
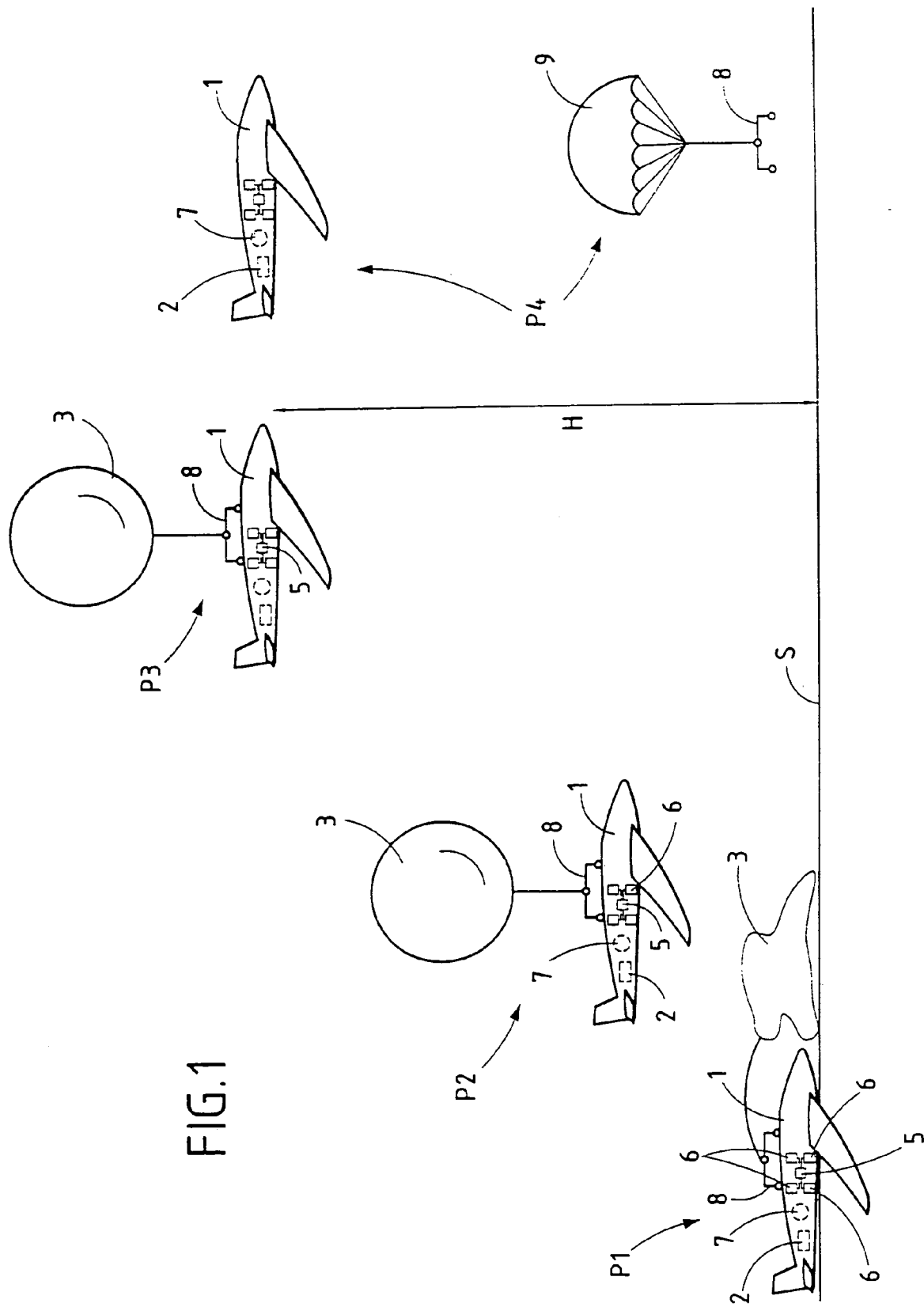
FIG. 1 shows the various steps in getting an aircraft of the invention onto station.

The aircraft 1 of the invention is put onto station by implementing four successive stages P1 to P4 as shown in FIG. 1 from left to right, using a specific transporter, in this case a balloon 3 of usual type. The aircraft 1 is put into station in the high atmosphere, in particular the stratosphere, at an altitude H above the ground S.

According to the invention, said aircraft 1, e.g. an airplane, includes propulsion means 2 that are capable of keeping, of moving, and of steering the aircraft solely in said high atmosphere. By way of example, these propulsion means can comprise a plasma thruster 2 which operates on the basis of a plasma created from the surrounding air in the high atmosphere. Said propulsion means could also be of the propeller type.

Because of the low pressure that exists in the stratosphere or the high atmosphere, said plasma can be created without using any feedstock, such as xenon, and without it being necessary for said aircraft 1 to carry a supply unit containing tanks, circuits, and valves, which would be bulky, heavy, and expensive. Such a thruster 2 is capable of delivering enough power to move and to steer the aircraft 1 in the intended applications as specified above. Furthermore, because of the above-mentioned characteristics, the thruster 2 is very simple and can operate indefinitely, since it requires no feedstock for the purpose of creating a plasma.

The aircraft 1 of the invention further comprises, by way of example, a solar generator 5 having solar cells 6 and cooled by convection with the surrounding air in the stratosphere which is generally at a temperature of about $-100°$ C. Because of this temperature, the yield of said solar generator 5 is improved.

Furthermore, according to the invention, the temperature characteristics of the materials supporting or adjacent to the solar cells 6 are adjusted in such a manner as to select the most efficient operating temperature. The solar generator 5 uses convective cooling, unlike generators that exist on the ground or in space, and is thus adapted to the specific environment that exists in the stratosphere or the high atmosphere.

It should also be observed that:
the connection architecture of the solar cells 6 (series connection, parallel connection, etc. . . . ) is selected as a function of the desired yields; and
the arrangement of the solar cells 6 on the outside surface of the aircraft 1 is selected as a function of the intended orientation of the aircraft 1.

Furthermore, said aircraft 1 has at least one battery 7, e.g. built using superconducting components that are particularly suited to the temperature conditions found in the high atmosphere. It should be observed that at the intended operating altitude H, in a convective environment whose temperature is close to $-100°$ C., keeping for example a torus of superconducting material at its operating temperature requires no more than a simple single-stage cryogenic machine that consumes little power.

Thus, by means of the above-specified elements 2, 5, and 7, which are particularly adapted to the operating conditions at high altitude, existing energy constraints are slackened to a considerable extent, thereby enabling the aircraft 1 to remain permanently in the high atmosphere and to operate over a long period relying solely on its on-board means.

As mentioned above, the simplified design of the propulsion means 2 of the aircraft 1 is due in particular to using a specific transporter 3, e.g. a balloon or a rocket, for getting said aircraft 1 onto station. Since said aircraft 1 does not need to be designed to be capable of flying from the ground up to the altitude H, it can be aerodynamically optimized for its intended operating altitude H.

According to the invention, getting the aircraft onto station comprises:
a stage P1 during which the aircraft 1 is fixed on the ground S to a nacelle 8 of said balloon 3, e.g. a stratospheric type balloon;
a stage P2 in which said balloon 3 is inflated and then lifts the aircraft 1 into the atmosphere;
a stage P3 in which said balloon 3 releases the aircraft 1 at the desired altitude H; and
a stage P4 in which, if necessary, the aircraft 1 moves finally onto station and takes up the desired orientation by making use solely of said propulsion means 2, while the nacelle 8 of the balloon falls back to the ground S on a parachute 9 and can be recovered.

The aircraft 1 of the invention can be used in numerous applications. In particular, as shown in FIG. 2, it can be used to replace a radio relay 10, specifically a satellite relay, in a telecommunications network RT that comprises a plurality of radio relays based in space and/or on the ground.

Figure 2:
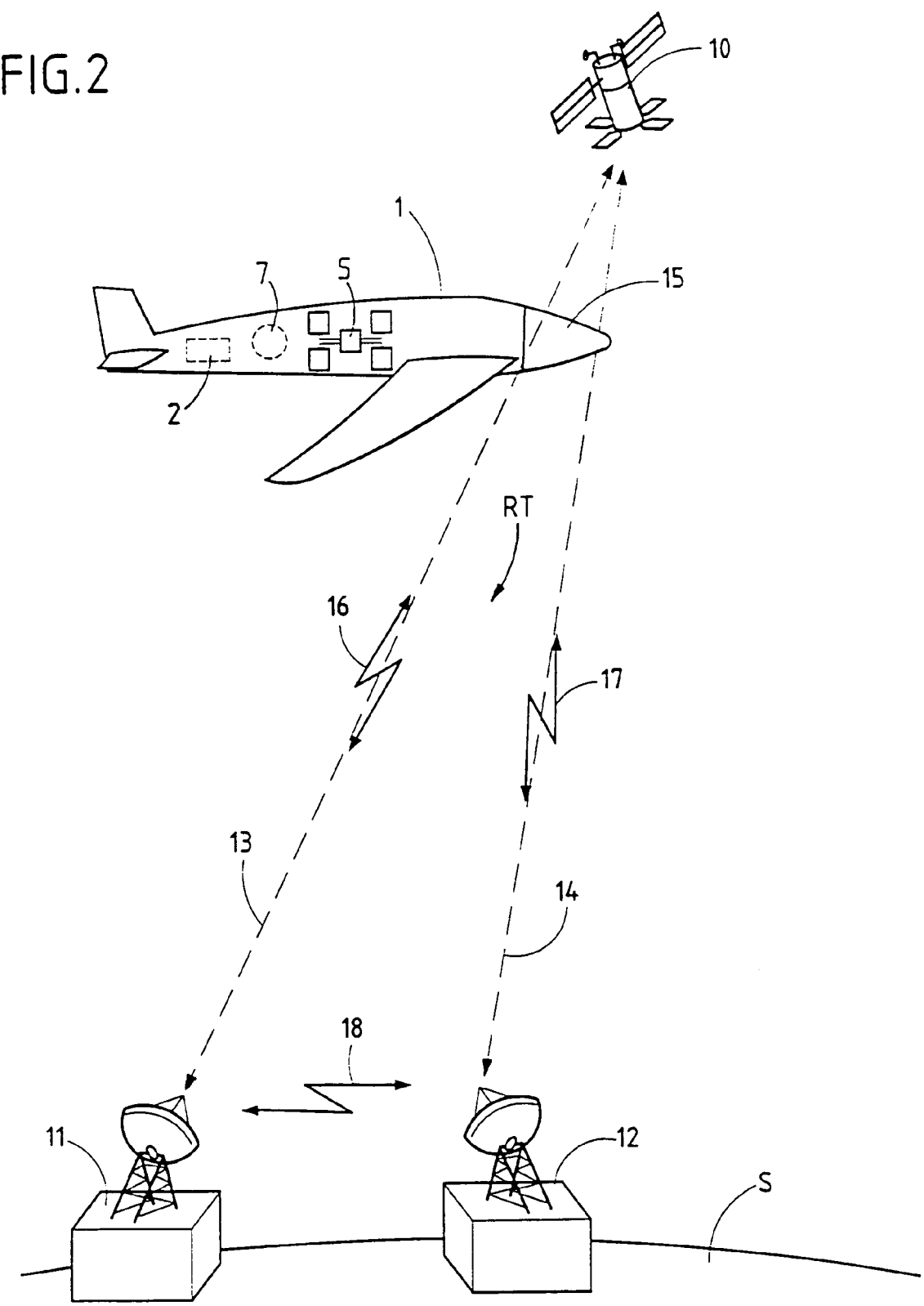
FIG. 2 shows a preferred application of an aircraft of the invention.

As can be seen in FIG. 2, said satellite relay 10 can communicate with users 11 and 12 of said telecommunications network RT, e.g. radio or television or mobile telephone receivers, respectively via the radio links 13 and 14 represented by dashed lines.

According to the invention, in order to replace said satellite relay 10, the aircraft 1 which is provided with radio wave transceiver means 15 is taken to an altitude and a position such that it lies in the same direction relative to said users 11 and 12 as said satellite relay 10 that is to be replaced, thereby making it possible to avoid any need to modify the pointing of user antennas. When such replacement is performed, said radio wave transceiver means 15 can communicate with the users 11 and 12 in the usual way, without changing the interfaces of the users 11 and 12, and as shown by respective radio links 16 and 17, said users 11 and 12 can communicate with each other, as represented by a radio link 18.

Naturally, instead of communicating directly with terminal users, said means 15 could equally well communicate with other relays (not shown) in the telecommunications network RT. Nevertheless, in accordance with the invention, in all implementations, the same interface is maintained (in frequency, protocol, power, . . . ) with existing terminal users.

It should be observed that instead of replacing a satellite relay 10, the aircraft 1 provided with the means 15 could naturally equally well be used in the context of the present invention to replace a relay situated on the ground.

Furthermore, since the aircraft 1 is relatively close to users (a few tens of kilometers) it can easily transmit with effective isotropic radiated power (EIRP) that is identical to that of a replaced relay.

It should be observed that the energy needed to obtain such power is much less, for example, than the energy needed to obtain the same power from a geostationary satellite or from a satellite in low earth orbit (LEO).

Such an aircraft 1 thus makes it possible to combine the advantages of ground networks as enjoyed in regions which are already fitted therewith (richness, good matching, flexibility, . . . ) with the advantages of satellites as enjoyed in regions which are not equipped with ground networks (instantaneous deployment without ground infrastructure).

According to the invention, said aircraft 1 provided with said radio wave transceiver means 15 can also be used to extend a preexisting telecommunications network (not shown) or to enable a new telecommunications network to be created in full or in part using a plurality of such aircraft 1.

The invention claimed is:

1. A method of replacing a radio relay in a telecommunications network comprising a plurality of radio relays, the method comprising the steps of:

replacing said radio relay (10) by an aircraft (1) of the airplane or glider type which has propulsion means (2) enabling said aircraft (1) to maintain itself, to move itself, and to orient itself solely at high altitude;

providing said aircraft with transceiver means (15) for radio waves (16, 17); and taking said aircraft (1) to an altitude and a position such that said transceiver means (15) lies in the same direction, relative to at least one user (11, 12) of said telecommunications network (RT), as said replaced relay (10), with operation between said transceiver means (15) and said user (11, 12) being performed via an already existing interface without modification thereof, thereby avoiding the need to modify the pointing direction of an antenna of said user.

2. The method according to claim 1, further comprising the step of providing said propulsion means (2) as at least one plasma thruster which operates using plasma created from the surrounding air at said high altitude.

3. The method according to claim 1, further comprising the step of providing said aircraft with at least one solar generator (5) cooled by convection with the surrounding air at said high altitude.

4. The method according to claim 1, further comprising the step of providing said aircraft with at least one storage battery (7) having superconductive components.

5. The method according to claim 1, further comprising the following steps:

on the ground, securing said aircraft (1) to an independent transporter (3);

causing said transporter (3) to take said aircraft (1) to the high altitude at which it is to operate, making use solely of said propulsion means;

causing said transporter (3) to release said aircraft (1) at the altitude (H) and at least approximately at the intended location of its operating station; and if necessary, causing said aircraft (1) to use said propulsion means (2) to put said aircraft finally on station and to take up its proper orientation.

6. The method according to claim 5, further comprising the step of providing said transporter (3) with at least one balloon (3) suitable for rising to the high altitude.

7. The method according to claim 1, wherein the replaced relay is a satellite relay, and said high altitude to which said aircraft is taken is in the stratosphere above both the altitude of civilian air links and the altitude of earth's cloud ceiling.

* * * * *